United States Patent [19]

Herweg et al.

[11] 4,072,788
[45] Feb. 7, 1978

[54] INSULATING ELEMENTS FOR WALLS AND CEILINGS

[75] Inventors: Peter Herweg, Burscheid; Werner Barthel, Leverkusen, both of Germany

[73] Assignee: Bayer Aktiengesellschaft, Leverkusen, Germany

[21] Appl. No.: 772,805

[22] Filed: Feb. 28, 1977

Related U.S. Application Data

[63] Continuation-in-part of Ser. No. 727,668, Sept. 29, 1976, abandoned.

[30] Foreign Application Priority Data

Oct. 3, 1975 Germany .............................. 2544280

[51] Int. Cl.² .............................................. B32B 3/10
[52] U.S. Cl. .................................. 428/139; 264/45.3; 264/45.4; 264/DIG. 7; 428/71; 428/306; 428/310; 428/313; 428/315

[58] Field of Search ................. 264/45.3, 45.4, 46.4, 264/DIG. 7; 428/68, 69, 71, 73, 74, 76, 117, 137, 138, 139, 140, 304, 306–308, 310, 313, 315

[56] References Cited

U.S. PATENT DOCUMENTS

| | | | |
|---|---|---|---|
| 2,977,639 | 4/1961 | Barkhuff, Jr. et al. | 264/45.4 |
| 3,091,998 | 6/1963 | Wehr et al. | 264/45.4 |
| 3,172,072 | 3/1965 | Willy | 428/313 |
| 3,464,872 | 9/1969 | Everett | 428/315 |
| 3,996,654 | 12/1976 | Johnson | 264/46.9 |

Primary Examiner—William J. Van Balen
Attorney, Agent, or Firm—Gene Harsh; Joseph C. Gil

[57] ABSTRACT

The invention relates to a method for the production of insulating elements for the walls and ceilings, made from facing layers fitted to a frame. Between the facing layers, a perforated foam-permeable, optionally reinforced, intermediate layer is inserted. One of the two chambers thus formed is subsequently filled with foam. The other chamber is filled with a foam permeated granular material.

6 Claims, 1 Drawing Figure

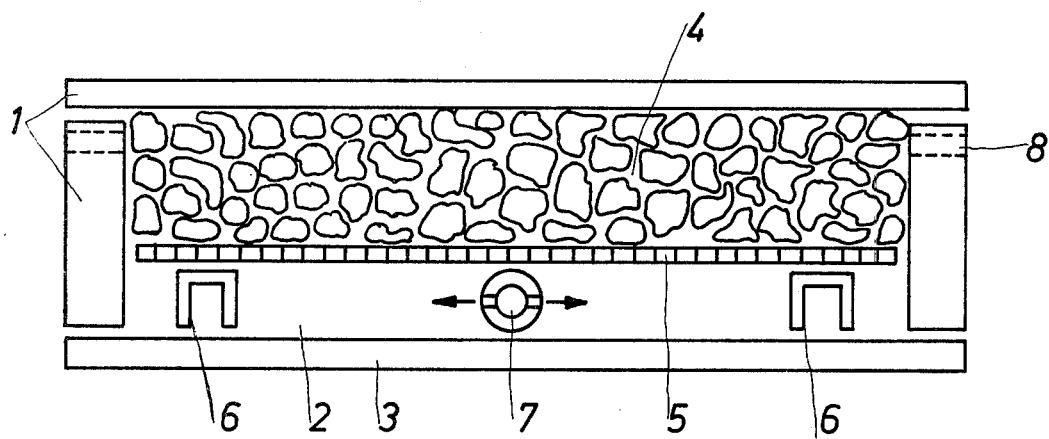

INSULATING ELEMENTS FOR WALLS AND CEILINGS

This application is a continuation-in-part of our co-pending application Ser. No. 727,668, filed Sept. 29, 1976, now abandoned.

BACKGROUND OF THE INVENTION

The use of faced foam-filled insulating elements for walls and ceilings in the construction industry is well known. The facades of buildings or the outside wall elements in the construction of single family prefabricated houses are typical examples of this application. To increase fire safety non-flammable granular additives are incorporated in the foam. Generally, such foams are referred to as light concrete components. Polyurethane, particularly polyisocyanurate, is preferred as the foamable composition.

A disadvantage of the faced foam-filled insulating elements for walls and ceilings known hitherto is that a combination of characteristics is often imperfectly matched to the application. It is desirable to independently adjust the gross density of the foam, the proportion of inflammable material in the concrete, the heat capacity of the element, the heat transfer coefficient of the element, sound dissipation of the element and thickness of the element. Unfortunately, the interrelationships between the above characteristics have precluded optimal design. For example, it has been undesirable but necessary to increase the thickness of the element in order to achieve a high sound and particularly heat insulation.

DESCRIPTION OF THE DRAWING

The FIGURE illustrates a wall element produced by the method of the invention.

DESCRIPTION OF THE INVENTION

The object of the invention is to develop an economic and versatile method for the production of insulating elements for walls and ceilings so that the characteristics of the insulator can be better adapted to the application.

Accordingly, the invention comprises two facing layers which are fixed to a frame and parallel thereto a perforated foam permeable intermediate layer. The two chambers formed thereby are foam filled. The first chamber formed by the perforated foam permeable intermediate layer contains a granular material and foam which fills the spaces remaining between the granular material. The second chamber contains foam but no granular material. The method of production for the insulating elements for walls and ceilings is characterized in that the first of the two chambers formed by the perforated foam-permeable intermediate layer is filled with granules. Then a foamable reaction mixture is introduced into the second chamber, which expands in the second chamber, penetrates the perforated inlay and fills out the empty spaces remaining between the granules in the first chamber.

One particular advantage of the method according to the invention is the possibility of pre-selecting the gross density of the foam in the granular layer over a wide range. Thus, the gross density can have lower values than have been usual hitherto. The added versatility results, because the foamable reaction mixture can easily expand in the space not filled with granules, and because the vertical paths in the granules are relatively small.

Further, the method is versatile because a smaller quantity of foamable mixture for a complete permeation of the granular layer by the foam is needed since the foam expands only in the direction of the thickness of the element. The method is particularly advantageous in the case of the polyisocyanurate foam, which is more fire resistant, because the reaction time is substantially less and the flow paths must, a priority, be shorter than for the polyurethane foam.

The claimed invention has a lower gross density of the foam in the granules than elements with a unified core, but the resultant decreased heat insulation is compensated for, and frequently even more than compensated, by the pure foam layer paralled to the outer wall facing. Surprisingly, a reduction in the foam mass in the insulating elements produced by the method according to the invention results, as compared to insulating elements having a unified core and the necessarily higher gross density of the foam in the granular layer, without allowances having to be made for other disadvantageous properties.

The heat transfer coefficient can be controlled simply by the thickness of the layer not filled with granules. For example, if the heat transfer coefficient is to remain constant, the thickness of the pure foam layer must be increased, if instead of expanded glass, expanded clay is used as the granules because the non-hygroscopic expanded glass conducts the heat less well than the expanded clay. By varying the thickness of the pure foam layer, the overall thickness of the insulating elements of expanded clay and expanded glass do not differ. The cost of the compound element made of the cheaper expanded clay is lower, although the rather thicker heat insulating pure foam layer is needed.

The method according to the invention permits the production to a greater extent than hitherto of insulating elements whose properties are better fitted to the intended application. In many cases, the matching of the thicknesses of the pure foam layer and the foam-permeated granular layer results in a lower overall thickness of the insulating element than with insulating elements produced by the methods known hitherto.

The fire behavior is of considerable importance. The thickness of the foam in the granular layer has a direct relation to the period of fire resistance, i.e. the greater the thickness of the foam in the granular layer, the shorter the period of fire resistance. Tests have shown that the insulating elements produced by the method according to the invention having gross densities of around 50 kg/m$^3$ display a more advantageous fire behavior than comparable insulating elements containing the same mass of foam but which are not produced by the method according to the invention and which necessarily have the greater gross density than the insulating elements whose core consists of two layers.

The heat retaining effect is also improved if the insulating element for walls is fitted in such a way that a pure foam layer lies directly underneath the outer facing.

Other materials for example sound-proof panels, can be incorporated in the core directly underneath the facing.

For use as the granular material, an expanded granular material is preferred, such as expanded clay, expanded glass, expanded slate or expanded mica, preferably 15-25 mm diameter. To improve sound insulation instead of expanded granules, a filling material of a higher density can be used, for example, cinders or blast furnace slag. It is characteristic of the method according to the invention that the deterioration of the heat insulation which results from the use of high density granules can be compensated for simply by providing a rather thicker pure foam layer.

Although the material of the facing layers is not essential to the invention, wood, anodized aluminum, sheet steel, plaster board, slate and other construction material may be used.

The frame can be made of metal, wood, plywood and other construction material.

The perforated foam permeable intermediate layer can be made of expanded metal, rigid or flexible plastic net, woven flexible organic and inorganic fibers and other perforated construction materials.

The foam can be made from any foamable mixture used and generally known in the art, but polyurethane foams are preferred and polyisocyanurate foams are particularly preferred. A polyurethane foam can be made by reacting polyisocyanates with high molecular weight hydroxyl containing compounds in the presence of known blowing agents and optionally in the presence of catalysts and foaming aids and optionally using chain extenders and/or cross linkers.

Any suitable organic isocyanate may be used including aliphatic and aromatic polyisocyanates. Examples of suitable organic diisocyanates including the heterocyclic organic diisocyanates are 1,6-hexamethylene diisocyanate, 1,4-butylene diisocyanate, furfurylidene diisocyanate and the preferred aromatic diisocyanates including 2,4-tolylene diisocyanate, 2,6-tolylene diisocyanate and mixtures thereof, preferably a mixture of about 80% 2,4- and 20% 2,6-tolylene diisocyanate, 4,4'-diphenylmethane diisocyanate, 4,4'-diphenyl-3,3'-dimethylmethane diisocyanate, 1,5-naphthalene diisocyanate, 1-methyl-2,4-diisocyanato-5-chlorobenzene, 2,4-diisocyanato-s-triazine, 1-methyl-2,4-diisocyanato cyclohexane, p-phenyl diisocyanate, and 1,4-naphthalene diisocyanate.

Any suitable isocyanate reactive organic compound containing at least two active hydrogen groups may be used. Examples of suitable types of organic compounds containing at least two active hydrogen containing groups are hydroxyl polyesters, polyhydric polyalkylene ethers, polyhydric polythioethers, polyacetals, aliphatic polyols, including alkane, alkene and alkyne diols, triols, tetrols, and the like.

A polyisocyanurate foam can be made from any of the above listed organic polyisocyanates in the presence of known blowing agents, trimerization catalysts and optionally in the presence of silicone-polyether copolymer surfactants. A more comprehensive discussion of isocyanurate containing foams and the method of preparation can be found in U.S. Pat. No. 3,922,238, the disclosure of which is hereby incorporated by reference.

The method according to the invention is illustrated in more detail in the example below and the drawing shows an insulating element produced by this method.

EXAMPLE

The choice of the frame and the facing depends on the intended application and is not essential to the invention. The cavity formed by the faced frame is divided by a perforated foam-permeable intermediate layer into two chambers; this partition runs parallel to the surface provided as the outer wall of the element. Expanded ribbed metal has proved particularly useful for use as the intermediate layer. To prevent this layer from bending during the filling of the outer chamber with granules and in particular in foaming, it must be reinforced at frequent intervals with spacers for example, made of polyvinyl chloride or polyethylene, in the empty chamber. Such spacers are also usual in ferroconcrete construction. The height of the spacers determines the thickness of the pure foam layer. Thicknesses of 15–25 mm are particularly preferred.

The outer chamber is filled with a granular material which corresponds to the intended application of the insulating element. In this example, expanded clay is used. During foaming, the insulating element is held in a press so that the chamber filled with the clay granules is located above the empty chamber. The method of addition of the foamable reaction mixture depends on the size of the wall element. To foam a 1 × 2 m, 70 mm thick panel, a single 2 m long pipe is sufficient. The pipe used is made out of polyvinyl chloride and has a 16 mm inside diameter. The pipe may be left inside the element. Two rows of 16 holes located opposite one another and 3 mm in diameter facilitate the flow of the reaction mixture from the pipe and distribute the mixture more or less uniformly in the chamber. In this Example the holes were made at the following intervals in cm (measured from the filling side): 20, 20, 20, 20, 20, 10, 10, 10, 10, 10, 10, 10, 10, 10, 4. The foamable reaction mixture consists of:

(A) 33 parts by weight of a polyol mixture of
   (i) 20 parts by weight of a polyester (produced from phthalic acid, adipic acid, oleic acid, and glycerine) having an OH number of about 390,
   (ii) 5 parts by weight of octaethylene glycol,
   (iii) 5 parts by weight of a propoxylated ethylene diamine having an OH number of about 600,
   (iv) 13 parts by weight of tricresyl phosphate, and
   (v) 1 part by weight of a polyether-polysiloxane, known as L 5320, available from Union Carbide;
(B) 25 parts by weight of monofluorotrichloromethane;
(C) 0.2 parts by weight of water;
(D) 2 parts by weight of glycerine;
(E) 3.5 parts of a 15 percent solution of sodium acetate in diethylene glycol; and,
(F) 100 parts by weight of a prepolymer formed from 93 parts of crude methylene-diphenyl diisocyanate and 7 parts of tripropylene glycol, the prepolymer having an NCO content of about 26 percent by weight.

The chamber is filled at a rate of 600 g/sec, for about 15 seconds. The setting time is about 65 seconds and the foam is free of stickiness in about 137 seconds. The mold release time is 60 minutes. The plate temperature of the press is 45° C. The free gross density is 25 kg/m$^3$, the raw density introduced is 55 kg/m$^3$. In the frame of the insulating element there are openings, through which the air compressed by the foaming can leave. It may happen that in the center of the panel at a depth of 2 cm there occurs a single point approximately 10 cm large which is not filled with foam. However, by means of a strip of fleece under the facing, it is possible for the whole core to be filled without empty spaces with foam of relatively low gross density.

The FIGURE illustrates a wall element produced by this method. It comprises a frame 1, for example, of wood, and is faced on the facade side, below which the pure foam layer 2 is preferably located, with anodized aluminum 3. The pure foam layer 2 and the foam permeated granular layer 4 are separated by a layer 5 of ribbed expanded metal of 0.3 mm sheet thickness. The drawing shows the spacers 6 and the filling pipe 7 which are left in the insulating element. Air escape openings 8 are indicated at the edges of the frame, 1.

What is claimed is:

1. A method for the production of insulating elements for walls and ceilings, comprising fixing facing layers to a frame, inserting parallel thereto a perforated foam permeable intermediate layer between the facing layers and substantially filling out the two chambers formed thereby with foam in a manner accomplished by filling the first of the two chambers formed by the perforated foam permeable intermediate layer with a granular material and introducing into the second chamber a foamable reaction mixture which expands in the second chamber, penetrates the perforated foam permeable intermediate layer and fills the spaces remaining between the granular material in the first chamber.

2. The method as claimed in claim 1, wherein the intermediate layer is reinforced.

3. The method as claimed in claim 2, wherein the foam is a polyisocyanurate foam.

4. The method as claimed in claim 2, wherein the granular material is selected from the group consisting of: expanded clay, expanded glass, expanded slate, expanded mica, cinders, and blast-furnace slag.

5. The method as claimed in claim 2, wherein the pure foam is located directly below the outer facing.

6. The insulating elements for walls and ceilings comprising of: two facing layers which are fixed to a frame, and parallel thereto a perforated foam permeable intermediate layer, the two chambers formed thereby are foam filled and characterized in that one chamber formed by the perforated foam permeable intermediate layer contains a granular material and foam which fills the spaces remaining between the granular material and the other chamber contain no granular material.

* * * * *